United States Patent [19]

Tomita et al.

[11] Patent Number: 4,990,324
[45] Date of Patent: Feb. 5, 1991

[54] METHOD FOR PRODUCING TWO-COMPONENT OR THREE-COMPONENT LEAD ZIRCONATE-TITANATE

[75] Inventors: Masahiro Tomita; Akira Fujii; Naoto Niwa; Hitoshi Niwa, all of Aichi; Shin-ichi Shirasaki, Ibaraki, all of Japan

[73] Assignees: Nippondenso Co., Ltd., Aichi; Science and Technology Agency Natl. Institute for Research in Inorganic Materials, Araki, both of Japan

[21] Appl. No.: 418,740

[22] Filed: Oct. 4, 1989

Related U.S. Application Data

[63] Continuation of Ser. No. 134,056, Dec. 17, 1987, abandoned.

[30] Foreign Application Priority Data

| Dec. 17, 1986 | [JP] | Japan | 61-298902 |
| Dec. 17, 1986 | [JP] | Japan | 61-298905 |
| Dec. 17, 1986 | [JP] | Japan | 61-300742 |
| Dec. 17, 1986 | [JP] | Japan | 61-300746 |
| Dec. 17, 1986 | [JP] | Japan | 61-300748 |

[51] Int. Cl.$^5$ .................. C01G 25/02; C01G 27/02
[52] U.S. Cl. .................. 423/608; 252/62.9; 423/592
[58] Field of Search ............. 423/593, 598, 263; 501/134, 23, 152, 102, 103; 252/62.9 R, 62.9

[56] References Cited

U.S. PATENT DOCUMENTS

| 2,911,370 | 11/1959 | Kulcsar | 252/62.9 |
| 3,403,103 | 9/1968 | Ouchi et al. | 252/62.9 |
| 3,862,829 | 1/1975 | Brandmayr et al. | 501/134 |
| 3,890,241 | 6/1975 | Nishida et al. | 252/62.9 |
| 3,923,675 | 12/1975 | Mazdiyashi et al. | 501/134 |
| 3,963,630 | 6/1976 | Yonezawa et al. | 501/134 |
| 3,997,690 | 12/1976 | Chen | 501/134 |
| 4,027,209 | 5/1977 | Maher | 501/134 |
| 4,061,583 | 12/1977 | Murata et al. | 423/598 |
| 4,062,790 | 12/1977 | Nishida et al. | 252/62.9 |
| 4,087,366 | 5/1978 | Tanaka et al. | 252/62.9 |
| 4,135,224 | 1/1979 | Maher | 501/134 |
| 4,152,280 | 5/1979 | Arendt et al. | 423/598 |
| 4,152,281 | 5/1979 | Arendt et al. | 423/598 |
| 4,219,866 | 8/1980 | Maher | 501/134 |
| 4,220,546 | 9/1980 | Satomura et al. | 252/62.9 |
| 4,230,589 | 10/1980 | Ogawa | 501/134 |
| 4,255,272 | 3/1981 | Ogawa | 501/134 |
| 4,283,228 | 8/1981 | Buchanan et al. | 501/134 |
| 4,293,534 | 10/1981 | Arendt | 423/598 |
| 4,355,256 | 10/1982 | Perduijn et al. | 252/62.9 |
| 4,391,901 | 7/1983 | Land et al. | 501/134 |
| 4,565,642 | 1/1986 | Jyomura et al. | 252/62.9 |
| 4,624,796 | 11/1986 | Giniewicz et al. | 501/134 |
| 4,626,369 | 12/1986 | Walker, Jr. | 501/134 |
| 4,696,810 | 9/1987 | Shirasaki et al. | 423/598 |
| 4,769,079 | 9/1988 | Clark et al. | 423/593 |
| 4,849,140 | 7/1989 | Wellinghoff et al. | 423/592 |

FOREIGN PATENT DOCUMENTS

61-127624 6/1986 Japan .

*Primary Examiner*—Peter D. Rosenberg
*Attorney, Agent, or Firm*—Cushman, Darby & Cushman

[57] ABSTRACT

Aqueous titanium tetrachloride solution and aqueous zirconium nitrate solution of components except zirconium, for forming lead zirconate-tinatate in which part of the lead is substituted for any of the lanthanide elements are mixed, and the mixture is hydrolyzed to form sol. This sol is cleaned, dried, and calcined at 1100° C. to form modified powder. The compounds of the remaining component of lead zirconate-titanate, such as $TiO_2$ powder, PbO powder and $Sm_2O_3$ powder, are mixed with the modified powder, and the resultant mixture is calcined at 750° C. for 1 hour to produce the lead zirconate-titanate.

6 Claims, 6 Drawing Sheets

METHOD FOR PRODUCING TWO-COMPONENT OR THREE-COMPONENT LEAD ZIRCONATE-TITANATE

This is a continuation of application Ser. No. 134,056, filed Dec. 17, 1987, now abandoned.

BACKGROUND OF THE INVENTION

The present invention relates to a method for producing two-component or three-component lead zirconate-titanate and, more particularly, to a method for producing a ceramic material containing zirconium for use as a ceramics, for example, in a piezoelectric unit, an optoelectronic material, a dielectric unit or a sensor, etc.

Two-component lead zirconate-titanate represented, for example, by $PbZrO_3$-$PbTiO_3$ and three-component lead zirconate-titanate represented by $PbZrO_3$-$PbTiO_3$-$Pb(MNb)O_3$ (where M is at least one of Mg, Zn and Ni, part of Pb can be substituted for at least one type of Ba, Sr and Ca) have excellent piezoelectric characteristic, and are used in a wide range of fields as a material for forming an actuator or a sensor, etc.

Heretofore, in order to produce such a porcelain composition, sole material powder of oxide of component of two-component or three-component lead zirconate-titanate in which part of lead is, for example, substituted for any of lanthanide elements is used, weighed, mixed in a ball mill or a thoron mill for 10 to 50 hours, and dried by a drying method to produce a mixture. The dried mixture is then calcined at 700° to 900° C. for 2 to 10 hours, and the calcined powder has 1 to 2 microns of mean particle diameter.

However, in the composition produced in this method, the dispersibility of $ZrO_2$ is not suitable to be readily coagulated, and varies in its composition within solid solution. Thus, $ZrO_2$ is not easily sintered, and must be sintered at high temperature. Since the mean particle diameter of the composition powder is large, it is difficult to form a PZT (Piezoelectric) porcelain which is in high density and high function.

SUMMARY OF THE INVENTION

An object of the present invention is to provide a method for producing lead zirconate-titanate which can obtain submicron order modified zirconia material powder having preferable dispersibility and obtain lead zirconate-titanate which is easy to sinter and has high bulk density by an ordinary drying method with the material powder.

Another object of the present invention is to provide a method for producing lead zirconate-titanate which can obtain functional ceramics having high performance and high density.

Still another object of the present invention is to provide a method for producing two-component or three-component lead zirconate-titanate which can be used to produce a ferrodielectric porcelain composition having high performance piezoelectric characteristic.

The inventors have confirmed as a result of studies to perform the above-mentioned objects that, when a coprecipitate obtained by reacting a suitable amount of at least one metal component except zirconium for forming two-component or three-component lead zirconate-titanate porcelain powder with a mixture solution containing zirconium solution and a precipitate forming solution or mixture such as a sol obtained by hydrolyzing the mixture solution was formed. Coagulation of particles of Zr rarely occurred due to the irregularity of the system. When it was dried and calcined at 700° to 1300° C., modified zirconia powder of submicron order powder containing extremely less coagulation of Zr was obtained. When this powder is mixed as a material by a drying method with the suitable amount of the remaining components except zirconium for forming lead zirconate-titanate porcelain powder, material powder having excellent submicron order powder characteristics is obtained, and extremely high density two-component or three-component porcelain is obtained by molding and sintering the material powder.

DETAILED DESCRIPTION OF THE PREFERRED EMBODIMENTS

A method for producing two-component or three-component lead zirconate-titanate in which part of the Pb is substituted for any of the lanthanide elements will be first described. The lead zirconate-titanate to be produced is fundamentally produced by way of the following steps.

The first step is to select at least one component M which is not zirconium, for forming two component or three component lead zirconate-titanate in which a part of lead is substituted with lanthanide elements in an amount suitable to suppress the coagulation of coprecipitate or sol and form a precipitate forming solution. A solution containing zirconium is produced. Then, the zirconium solution is caused to react with precipitate forming solution or hydrolyzed to produce coprecipitate or sol, which is then dried, calcined at 700° to 1300° C. to provide modified zirconia.

The second step mixes the modified zirconia obtained by calcining as described above, and at least one residual component compound which is not zirconium, for forming the two component or three component lead, and calcining the mixture at 500° to 1300° C. In this second step, the desired compound composition is obtained by adding the residual component.

The calcined powder, obtained as described above, is compression-molded into a suitable shape, and sintered at 700° to 1500° C. to produce two-component or three-component lead zirconate-titanate porcelain.

Here, the compounds for producing the zirconium solution includes zirconium oxychloride, zirconium oxynitrate, zirconium chloride, and zirconium nitrate. The solvents used for dissolving the zirconium solution compounds are water or alcohol. All the above-mentioned compounds are soluble in water, and zirconium oxychloride, zirconium chloride and titanium tetrachloride are soluble in ethanol. Further, in order to produce the zirconium solution, metallic zirconium may be dissolved in aqua regia or HF.

The type and the amount of the components of zirconate titanate in which a part of lead is substituted for any of the lanthanide elements to be dissolved in a zirconium-containing solution, are preferably those which can effectively suppress the coagulation of zirconia powder, and the compounds for producing the solution of at least one component, except zirconium, of the lead zirconate-titanate in which part of lead is substituted for any of the lanthanide elements containing $Pb(NO_3)_2$, $Ti(NO_3)_4$, $TiCl_4$, $Ti(SO_4)_2$, $Mg(NO_3)_2$, $MgCl_2$, $MgSO_4$, $Zn(NO_4)_2$, $ZnCl_2$, $ZnSO_4$, $Ni(SO_3)_2$, $NiCl_2$, $NiSO_4$, $NbCl_5$, etc. The solvents of these components are water or alcohol. The zirconium solution and the solutions except the zirconium solution may be separately prepared, and compounds may be dissolved in the same solvent to prepare the solution.

The case in which the sol is produced by hydrolyzing the zirconia solution will be described. The zirconia solution may be hydrolyzed in a heating state at approx. 100° C. The sol, obtained by this hydrolysis is recovered in a furnace or by cleaning, as a modified zirconia.

Various modifications are considered with respect to sol component combinations. For example, in two-component lead zirconate-titanate, represented by $(Pb, Sm)(Zr, Ti)O_3$, the sol containing $Zr^{4+}$ and $Sm^{3+}$, is obtained from the mixture of aqueous zirconium oxynitrate solution and aqueous solution of $Sm(NO_3)_3$ (samarium nitrate). The sol containing $Zr^{4+}$ and $Ti^{4+}$ obtained from the mixture of aqueous zirconium oxychloride solution and aqueous titanium tetrachloride solution, the sol containing $Pb^{2+}$ and $Sm^{3+}$ of at least two types of components, except Zr, is obtained from the aqueous solution of aqueous $Pb(NO_3)_2$ (lead nitrate) solution and a small amount of aqueous samarium solution separately from before, these two sols are dried and calcined, and a sufficient amount of the components of the two-component lead zirconate-titanate may be added thereto.

The sol containing $Zr^{4+}$ and $Ti^{4+}$ obtained from the mixture of the aqueous zirconium oxychloride solution and the aqueous titanium tetrachloride solution, and sol containing $Sm^{3+}$ is obtained from the aqueous solution of samarium nitrate containing Sm of one type of component, except Zr is separately obtained from before, these sols are calcined so as to obtain oxide powder, and insufficient components to be produced is added to the oxide powder.

When producing 3-component lead zirconate-titanate, various modifications may be made in the sols' combinations. For example, in 3-component lead zirconate-titanate represented by $PbZrO_3$-$PbTiO_3$-$Pb(M_{1/3}Nb_{2/3})O_3$ (where M is one or Mg, Zn and Ni), the sol containing $Zr^{4+}$ and $Pb^{2+}$ may be obtained from the mixture of aqueous zirconium oxynitrate solution and aqueous solution of lead nitrate. Further, the sol containing $Zr^{4+}$ and $Ti^{4+}$ obtained from the mixture solution of aqueous zirconium oxynitrate and aqueous titanium tetrachloride solution, and the sol containing $Nb^{5+}$ and $Pb^{2+}$ of at least two types of components except Zr is obtained from the aqueous niobium pentachloride and aqueous solution of lead nitrate separately from before, these sols are calcined to obtain oxide powder, and insufficient components of the three-component composition to be produced may be added to the oxide powder.

Moreover, the sol containing $Zr^{4+}$ and $Ti^{4+}$ is obtained from the mixture solution of aqueous zirconium oxychloride and aqueous titanium tetrachloride, the sol containing $Zt^{4+}$ and $Nb^{5+}$ is obtained from the mixture solution of aqueous zirconium oxychloride solution and aqueous niobium pentachloride solution separately from before, these two sols are calcined to produce oxide powder, and insufficient component of the composition to be produced is added thereto.

The sol containing $Zr^{4+}$ and $Ti^{4+}$ obtained from the mixture solution of aqueous zirconium oxynitrate solution and aqueous titanium tetrachloride solution, and the sol containing $M^{2+}$ is obtained from the aqueous solution of $M(NO_3)_2$ of nitrate compound of M is obtained separately from before. The sol containing $Zr^{4+}$ and $Ti^{4+}$ and the sol containing the $M^{2+}$ are calcined, and insufficient components for forming the calcined powder and the composition to be produced are added. The calcined powder of the sol thus obtained is used to produce porcelain. Here, the calcining temperatures of the sols are 700° to 1300° C. If the calcining temperature is lower than 700° C., a coagulation remarkably occurs, while if the calcining temperature is higher than 1300° C., the particles are roughened. The insufficient amount of 3-component lead zirconate-titanate in such part of lead is substituted for any of lanthanide elements to be produced is added to be mixed with the calcined powder obtained in this manner.

In this case, it is necessary to add the insufficient zirconium and component to be added to the zirconium thereto. The grain size of any compound powder (mainly oxide) employs submicron order. However, even if the lead oxide powder employs large particle size, it does not almost affect the influence to the characteristics of the obtained composition powder.

The calcining temperatures of the mixtures are needed to be higher than the lowest temperature for substantially or completely performing solid reaction in the highest temperature range so as not to cause remarkable particle growth, which is set to 500° to 1300° C.

The powder thus obtained is molded and sintered to obtain porcelain having the characteristics of the object, and the sintering temperatures depend upon the type of the component, and are generally 700° to 1500° C. Here, if the sintering temperature is lower than 700° C., the sintering becomes insufficient, and if the sintering temperature exceeds 1500° C., the particles are increased, or the component is volatilized.

Then, concrete example of producing lead zirconate-titanate in which part of led is substituted for any of lanthanide elements will be described. One preferred lead zirconate-titanate produced by this method is $Pb(Y_{\frac{1}{2}}Nb_{\frac{1}{2}})O_3$-$PbTiO_3$-$PbZrO_3$.

EXAMPLE 1

43.57 cc of aqueous titanium tetrachloride solution (0.751 mol/l density) and 150 cc of aqueous zirconium oxychloride solution (0.873 mol/l density) were mixed. This aqueous mixture solution was hydrolyzed by holding the mixture solution at 100° C. for 100 hours to obtain sol containing $Ti^{4+}$ and $Zr^{4+}$. This sol was cleaned and dried, and then calcined at 1100° C. to produce powder of $(Ti_{0.2}Zr_{0.8})O_2$. The particles of the powder were submicron order.

1.2549 g of fine powder of $TiO_2$, 11.16 g of PbO powder, and 0.2739 g of fine particles of $Sm_2O_3$ sold in the market were mixed together with 4.1981 g of the calcined powder in a ball mill for a whole day and night, the mixture was then calcined at 750° C. for 1 hour to produce powder of lead zirconate-titanate of $Pb_{0.955}Sm_{0.03}(Zr_{0.56}Ti_{0.44})O_3$. The particle diameter of this powder was approx. 0.42 micron.

The powder thus obtained was molded or cold pressed under the pressure of 1 ton/cm², sintered at 1200° C. in lead vapor and oxygen gas coexistent atmosphere for 1 hour to produce porcelain, and the density of the porcelain was considerably near theoretical density.

As a result that lead zirconate-titanates were produced in the similar steps with oxides of lanthanide elements, such as $La_2O_3$, $Nd_2O_3$, $Gd_2O_3$ instead of $Sm_2O_3$, similar result to those of the case of the $Sm_2O_3$ could be obtained.

COMPARISON EXAMPLE 1 (TO EXAMPLE 1)

Powders of PbO, $Sm_2O_3$, $TiO_2$ and $ZrO_2$ sold in the market were so mixed as to produce a composition of $Pb_{0.955}Sm_{0.03}(Zr_{0.56}Ti_{0.44})O_3$. After the mixtures were mixed in a ball mill for a whole day and night, the mixture was calcined at 850° C. for 2 hours. After the calcined powder thus obtained was molded at 1 ton/cm², the molded powder was sintered at 1200° C. in lead vapor and oxygen gas coexistent atmosphere for 1 hour, and the density of the porcelain thus obtained was approx. 7.2.

The powder thus calcined was made of large coagulation, and the mean particle diameter could not be specified.

EXAMPLE 2

43.57 cc of aqueous titanium tetrachloride solution (0.751 mol/l density) and 150 cc of aqueous zirconium oxychloride solution (0.873 mol/l density) were mixed. This aqueous mixture solution was hydrolyzed by holding the mixture solution at 100° C. for 100 hours to obtain sol containing $Ti^{4+}$ and $Zr^{4+}$. This sol was cleaned and dried, and then calcined at 1100° C. to produce powder of $(Ti_{0.2}Zr_{0.8})O_2$. The particles of the powder were submicron order.

1.1985 g of fine powder of $TiO_2$, 11.16 g of PbO powder, 0.8861 g of fine particles of $Nb_2O_5$ and 0.134 g of fine powder of MgO sold in the market were mixed together with 2.8639 g of the calcined powder in a ball mill for a whole day and night, the mixture was then calcined at 750° C. for 1 hour to produce powder of three-component lead zirco-titanate powder represented by $0.2Pb(Mg_{1/3}Nb_{2/3})O_3-0.4PbZrO_3-0.4PbTiO_3$. The particle diameter of this powder was approx. 0.39 micron.

The powder was molded under the pressure of 1 ton/cm², sintered at 1200° C. in lead vapor and oxygen gas coexistent atmosphere for 1 hour to produce porcelain, and the density of the porcelain was considerably near theoretical density.

As a result that three-component lead zirco-titanates were produced in the similar steps with ZnO, NiO instead of Mg, similar result to those of the case of the MgO could be obtained.

COMPARISON EXAMPLE 2

Powders of PbO, $Nb_2O_5$, $TiO_2$ and MgO sold in the market were so mixed as to produce a composition of $0.2Pb(Mg_{1/3}Nb_{2/3})O_3-0.4PbTiO_3-0.4PbZrO_3$. After the mixtures were mixed in a ball mill for a whole day and night, the mixture was calcined at 800° C. for 2 hours. After the calcined powder thus obtained was molded at 1 ton/cm², the molded powder was sintered at 1200° C. in lead vapor and oxygen gas coexistent atmosphere for 1 hour, and the density of the porcelain thus obtained was approx. 7.2.

The powder thus calcined was made of large coagulation, and the mean particle diameter could not accordingly be specified.

EXAMPLE 3

300 cc of aqueous zirconium oxychloride solution (0.873 mol/l density) and 38.75 cc of aqueous niobium pentachloride solution (0.751 mol/l density) were mixed. This aqueous mixture solution was hydrolyzed by holding the mixture solution at 100° C. for 100 hours to obtain sol containing $Nb^{5+}$ and $Zr^{4+}$. This sol was cleaned and dried, and then calcined at 1100° C. to produce powder of $(Nb_{0.1}Zr_{0.9})O_{2.05}$. The particles of the powder were submicron order.

1.598 g of fine powder of $TiO_2$, 0.1344 g of fine powder of MgO, 11.16 g of powder of PbO and 0.5907 g of fine powder of $Nb_2O_5$ sold in the market were treated together with 2.760 g of the powder thus obtained similarly to the same method as that in the Example 1 to produce powder of three-component lead zirconate-titanate porcelain represented by $0.2Pb(Mg_{1/3}Nb_{2/3})O_3-0.4PbZrO_3-0.4PbTiO_3$. The particle diameter of this powder was considerably near theatrical density.

In the Examples 1 to 3 described above, the sols are obtained by hydrolyzing the aqueous zirconium solution. However, coprecipitate may be formed from the aqueous zirconium solution. In other words, the amount sufficient to suppress the coagulation of the precipitate of at least one component except the zirconium for forming the two-component or three-component lead zirconate-titanate in which part of the lead of the lanthanide elements is substituted is selected, and solution containing zirconium is produced. This solution is then reacted with the precipitate forming solution to form coprecipitate. The coprecipitate is dried and calcined at 700° to 1300° C. In this calcining step, the coagulation of the coprecipitate can be avoided to produce modified zirconium.

Reagents for producing the precipitate forming solution include, for example, ammonia water, ammonium carbonate, caustic alkali, oxalic acid, ammonium oxalate, and organic reagents, such as amine, oxine at ambient temperature in precipitate forming reaction. The state of the coprecipitate is sol or slurry state, and the coprecipitate is recovered by filtering and cleaning.

Various modifications may be formed in other combinations of the coprecipitate, and are similar to the case of the sols, and the case of this coprecipitate will be described in the following examples.

EXAMPLE 4

43.57 cc of aqueous titanium tetrachloride solution (0.751 mol/l density) and 150 cc of aqueous zirconium oxychloride solution (0.873 mol/l density) were mixed. This aqueous mixture solution was gradually added to 1 l of agitating 6N-ammonia water to produce hydroxide coprecipitate containing $Ti^{4+}$ and $Zr^{4+}$. The coprecipitate thus obtained was cleaned, dried, and calcined at 1100° C. to produce powder of $(Ti_{0.2}Zr_{0.8})O_2$. The mean particle diameter of the powder was 0.32 micron.

1.2549 g of fine powder of $TiO_2$, 11.16 g of PbO powder, and 0.2739 g of fine particles of $Sm_2O_3$ sold in the market were mixed together with 4.1981 g of the calcined powder in a ball mill for a whole day and night, the mixture was then calcined at 750° C. for 1 hour to produce powder of lead zirconate-titanate powder represented by $Pb_{0.955}Sm_{0.03}(Zr_{0.56}Ti_{0.44})O_3$. The particle diameter of this powder was approx. 0.42 micron. The powder was molded under the pressure of 1 ton/cm², sintered at 1200° C. in lead vapor and oxygen gas coexistent atmosphere for 1 hour to produce porcelain, and the density of the porcelain was 7.82 considerably near theoretical density.

Even when porcelain were produced in the similar steps with lanthanide elements, such as $La_2O_3$, $Nd_2O_3$, $Gd_2O_3$ instead of $Sm_2O_3$, similar result to those of the above Examples could be obtained.

COMPARISON EXAMPLE 3

See the Comparison Example 1.

EXAMPLE 5

43.57 cc of aqueous titanium tetrachloride solution (0.751 mol/l density) and 150 cc of aqueous zirconium oxychloride solution (0.873 mol/l density) were mixed. This aqueous mixture solution was gradually added to agitating 1 l of 6N-ammonia water to produce hydroxide coprecipitate containing $Ti^{4+}$ and $Zr^{4+}$. The coprecipitate was cleaned, dried, and then calcined at 1100° C. to produce powder of $(Ti_{0.2}Zr_{0.8})O_3$, and the mean particle diameter of the powder was 0.32 micron.

1.1985 g of fine powder of $TiO_2$, 11.16 g of PbO powder, 0.8861 g of fine particles of $Nb_2O_5$ and 0.1344 g of fine powder of MgO sold in the market were mixed together with 2.8639 g of the calcined powder thus obtained in a ball mill for a whole day and night, the mixture was then calcined at 750° C. for 1 hour to produce powder of three-component lead zirconate-titanate powder represented by $0.2Pb(Mg_{1/3}Nb_{2/3})O_3$-$0.4PbZrO_3$-$0.4PbTiO_3$. The particle diameter of this powder was approx. 0.39 micron. The powder was molded under the pressure of 1 ton/cm$^2$, sintered at 1200° C. to produce porcelain, and the density of the porcelain was considerably near theoretical density.

As a result that three-component lead zirconate-titanates were produced in the similar steps with ZnO, NiO instead of Mg, similar result to those of the case of the MgO could be obtained.

COMPARISON EXAMPLE 4

See the Comparison Example 2.

EXAMPLE 6

300 cc of aqueous zirconium oxychloride solution (0.873 mol/l density) and 38.75 cc of aqueous niobium pentachloride solution (0.751 mol/l density) were mixed. This aqueous mixture solution was gradually added to 1 l of agitating 6N-ammonia water to produce hydroxid coprecipitate containing $Nb^{4+}$ and $Zr^{4+}$. This coprecipitate was cleaned, dried and calcined at 1100° C. to produce powder of $(Nb_{0.1}Zr_{0.9})O_{2.05}$. The powder was submicron order.

1.598 g of fine powder of $TiO_2$, 11.16 g of PbO powder, 0.5907 g of fine powder of $Nb_2O_5$ and 0.1344 g of fine powder of MgO sold in the market were treated together with 2.760 g of the powder thus obtained similarly to the same method as that in the Example 4 to produce powder of three-component lead zirconate-titanate porcelain represented by $0.2Pb(Mg_{1/3}Nb_{2/3})O_3$-$0.4PbZrO_3$-$0.4PbTiO_3$. The particle diameter of this powder was very near the theoretical density.

In the lead zirconate-titanate in which part of lead is substituted for any of lanthanide elements as described in the Examples described above, the zirconium powder (modified zirconium powder) containing one type or more of the components for forming the lead zirconate-titanate can be formed in extremely small submicron particles of secondary particles. With this powder, porcelain powder of two-component or three-component lead zirconate-titanate of submicron order can be readily obtained by a simple drying method with molding and sintering steps with ordinary pressure thereafter. When the powder is used as a material, the porcelain of high density extremely near the theoretical density can be produced, and the following advantages are further expected.

The modified zirconium powder obtained by calcining is sufficiently dispersed, and the step of pulverizing the calcined product is not particularly necessary. Since the porcelain powder in which part of lead is substituted for any of lanthanide elements obtained by a drying method from the calcined modified zirconium powder is obtained in a solely dispersed state, sufficiently excellent sinterability can be obtained even except the pulverizing step to readily produce porcelain of high density.

The porcelain of this type required for extremely high density does not need operations of hot pressing or hot gas pressure sintering (HIP) and is obtained by mere solid sintering without necessity of sintering assistant, thereby obtaining a density extremely near the theoretical density.

EXAMPLE 7

Figure 1:
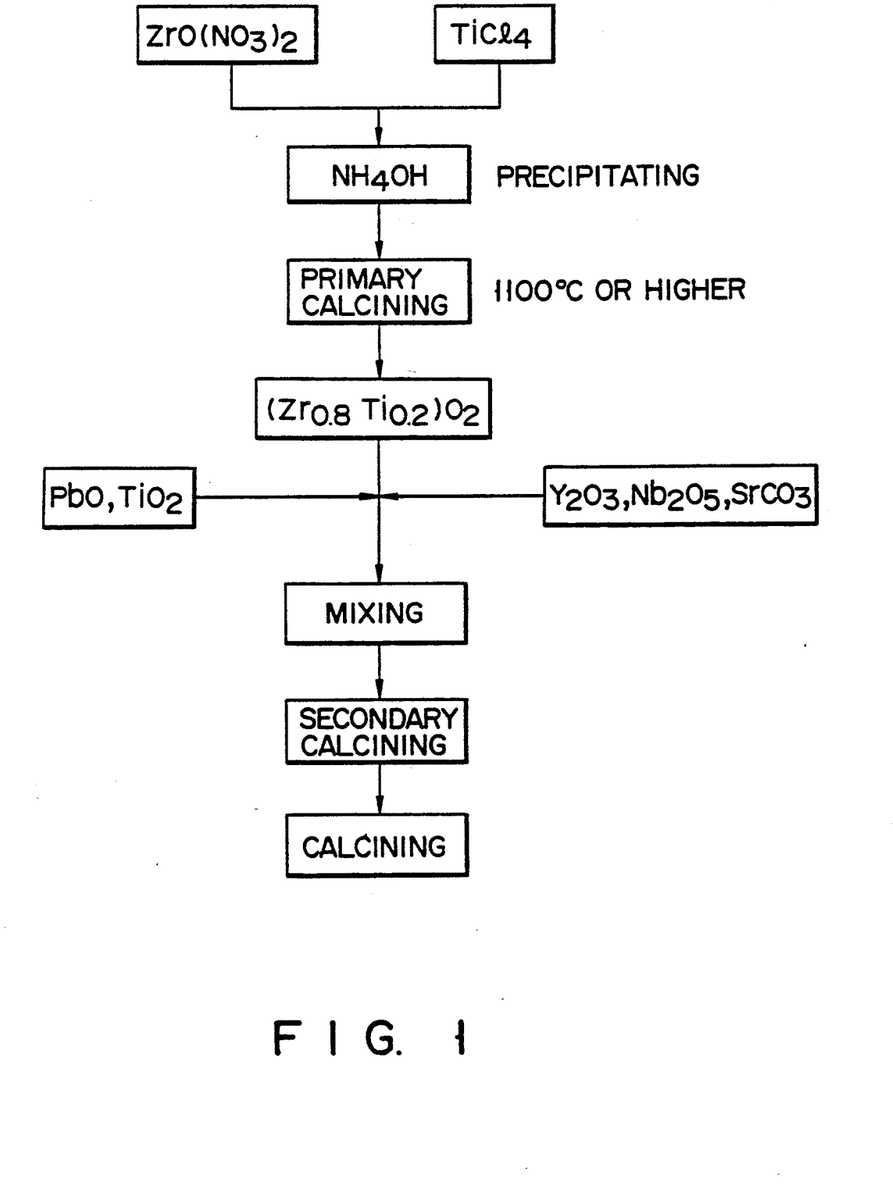
FIGS. 1 to 6 are block diagrams for describing the producing steps of examples 7 to 12.

The steps of this Example are shown in FIG. 1. First, aqueous zirconium oxynitrate solution and aqueous titanium tetrachloride solution were so mixed to satisfy the relationship of Zr-rich of "Zr/Ti=8/2". This aqueous mixed solution was gradually added to agitating 6N-ammonia water to produce hydroxide coprecipitate containing $Ti^{4+}$ and $Zr^{4+}$. This coprecipitate was cleaned, dried, and calcined at 1100° C. to produce powder of $(Zr_{0.8}Ti_{0.2})O_2$. The mean particle diameter of the powder was approx. 0.3 micron.

The calcined powder thus obtained was mixed in a ball mill for a whole day and night with $TiO_2$, PbO, $Y_2O_3$, $Nb_2O_5$, $SrCO_3$, etc. sold in the market by so weighing as to produce a composition, for example, of sample 1 of Table 1. The mixture was then calcined at 800° C. for 5 hours to form powder of solid solution of predetermined composition. The mean particle diameter of the powder was approx. 0.35 micron.

Ferrodielectric porcelain composition was produced with the calcined powder thus obtained. This powder was molded under the pressure of 500 kg/cm$^2$, and calcined at 1160° C. in oxygen gas atmosphere containing lead vapor for 2 hours. The specific weight of the sample obtained by this calcining was 7.66 high, and the electromechanical coupling coefficient Kp was 0.68 high.

COMPARISON EXAMPLE 5

$TiO_2$, $ZrO_2$, PbO, $Y_2O_3$, $Nb_2O_5$, $SrCO_3$ sold in the market were so weighed as to form the composition of the sample 1 in Table 1, mixed in a ball mill for a whole day and night, and calcined at 800° C. for 5 hours. The mean particle diameter of the powder thus obtained was approx. 1.8 micron.

The powder thus obtained was molded under the pressure of 500 kg/cm$^2$ to form a sample, and this sample was calcined at 1300° C. in lead vapor and oxygen gas coexistent atmosphere for 2 hours. The specific weight of the sintered product thus obtained was 7.38 low, and the electromechanical coupling coefficient Kp was 0.60 low.

In Table 1, the specific weights and the electromechanical coupling coefficients Kp of the examples of different compositions in three-component solid solutions of $PbTiO_3$-$PbZrO_3$ when produced similarly to the Examples 7 and the Comparison Example 5 were shown as samples 2 to 4. In all the examples of Table 1, the specific weights are larger than those of the corresponding Comparison Examples, and the electromechanical coupling coefficients Kp are also larger.

Thus, the modified zirconium powder produced by the coprecipitate $(Zr_{0.8}Ti_{0.2})O_2$ can be formed in submicron order particles containing extremely less secondary particles. With this the submicron order material powder can be easily obtained thereafter by a simple drying method, and with the powder as material ceramics of low sintering temperature and high density can be produced.

EXAMPLE 8

Figure 2:
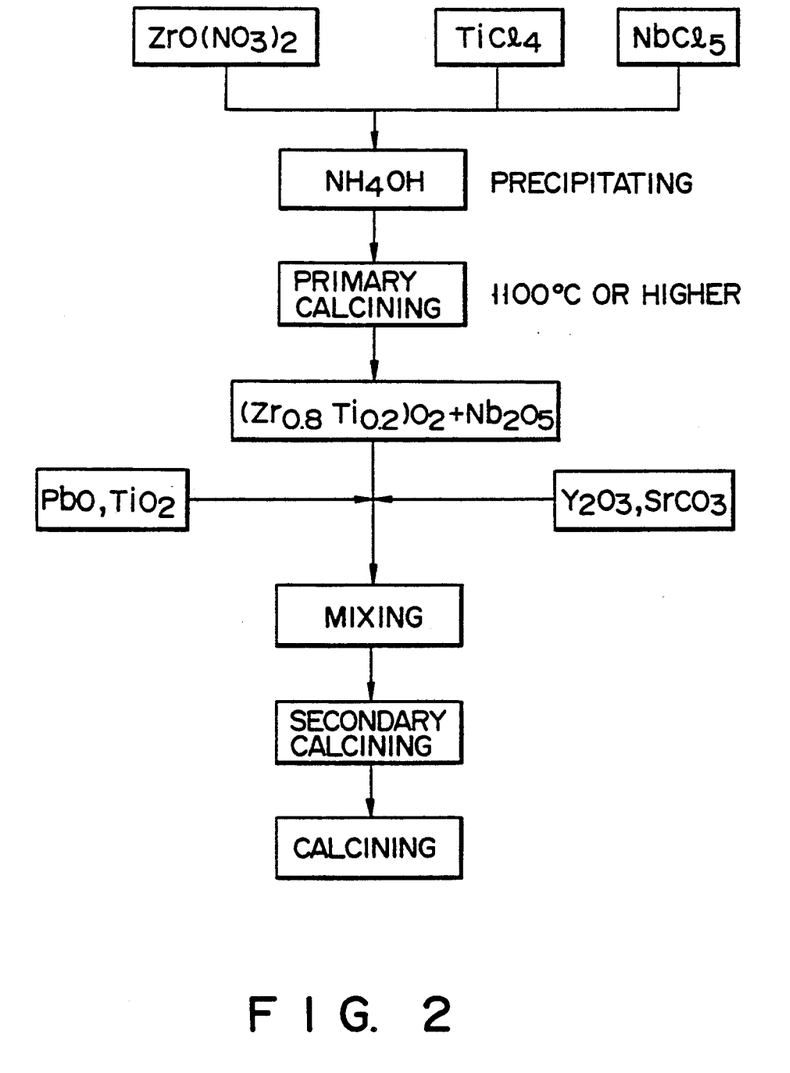

As shown in FIG. 2, in this Example, hydroxide containing $Nb^{5+}$ was also coprecipitated in addition to the hydroxide coprecipitate containing $Ti^{4+}$ and $Zr^{4+}$. Thereafter, three-component solid solution of the characteristics shown in the sample 5 of Table 1 was formed by the steps similar to the Example 7 in the following steps.

In this Example, since $Nb_2O_5$ having wrong dispersibility was produced by coprecipitation, the $Nb_2O_5$ could be uniformly dispersed. Therefore, the specific weight and other characteristics were slightly exceeded as compared with the case of the Example 7.

EXAMPLE 9

Figure 3:
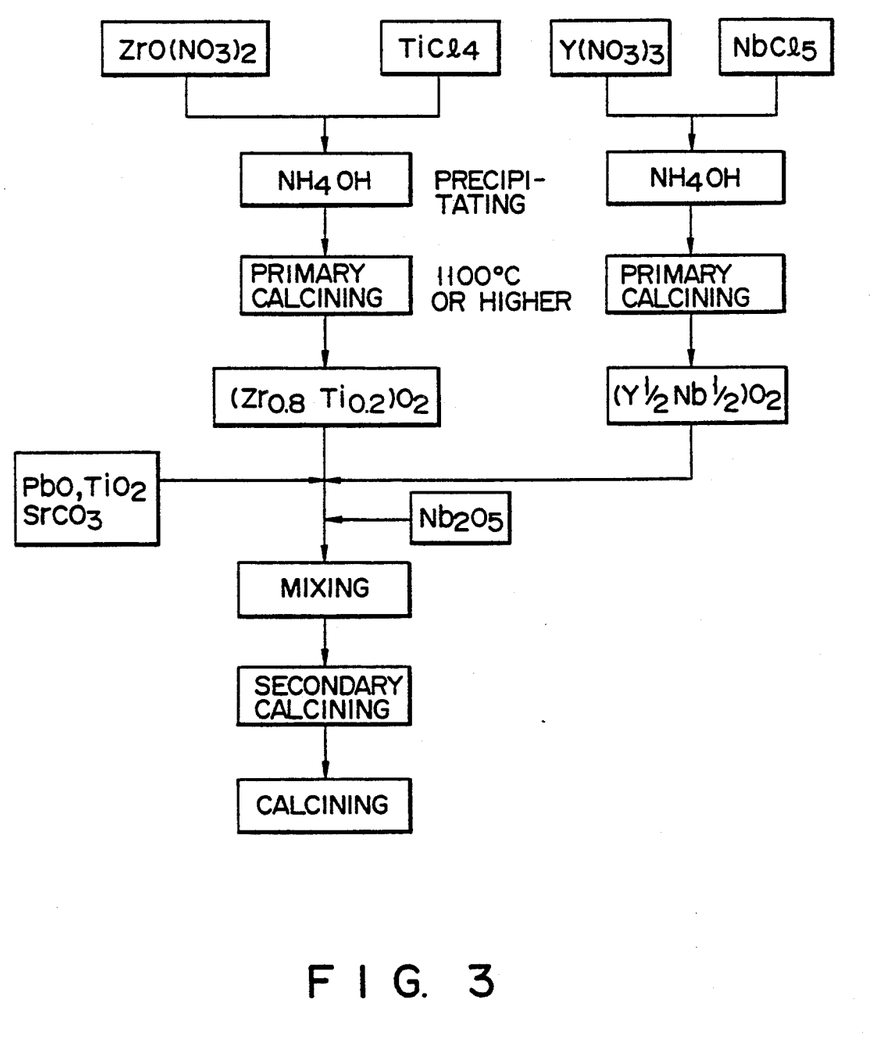

As shown in FIG. 3, hydroxide coprecipitate containing $Y^{3+}$ and $Nb^{5+}$ was calcined except $(Zr_{0.8}Ti_{0.2})O_2$ to produce in advance $(Y_\frac{1}{2}Nb_\frac{1}{2})O_2$, and the sample indicated by the sample 6 in Table 1 was produced in the similar steps to those in the Example 7.

The dispersibility of $Nb_2O_5$ was uniformly performed even in this Example, and the specific weight and other characteristics were substantially similar to those in the Example 8.

EXAMPLE 10

Figure 4:
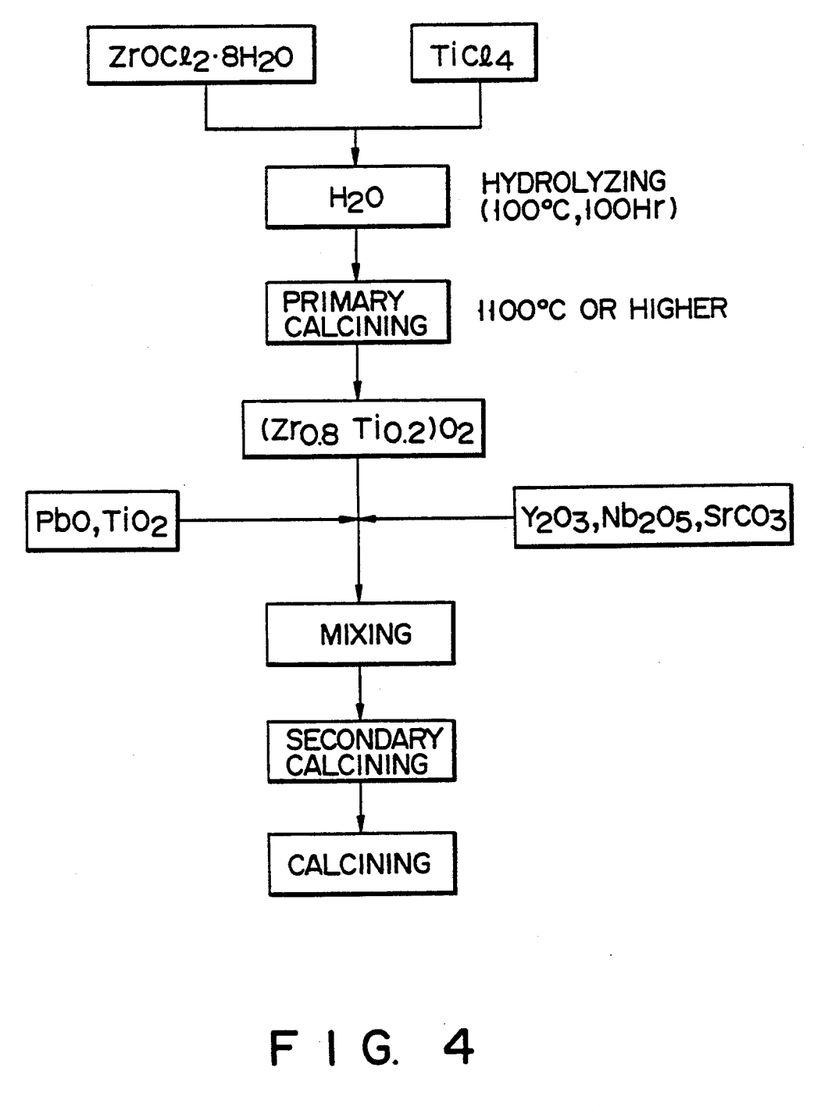

As shown in FIG. 4, aqueous zirconium oxychloride solution and aqueous titanium tetrachloride solution were mixed in a relationship of Zr-rich of "Zr/Ti=8/2". This aqueous mixture solution was hydrolyzed by holding it at 100° C. for 100 hours to form sol containing $Ti^{4+}$ and $Zr^{4+}$. This sol was cleaned, dried and calcined at 1100° C. to produce powder of $(Zr_{0.8}Ti_{0.2})O_2$. The mean particle diameter of the powder was approx. 0.3 micron.

The powder thus obtained was mixed in a ball mill for a whole day and night by so weighing $TiO_2$, PbO, $Y_2O_3$, $SrCO_3$, etc. sold in the market as to form a composition, for example, of sample 1 in Table 1, and then calcined at 800° C. for 5 hours. The mean particle diameter of the calcined powder thus obtained was 0.35 micron.

The calcined powder was used, for example, as ferrodielectric porcelain composition. This powder was molded under the pressure of 500 kg/cm² to produce a sample, and this sample was calcined at 1160° C. in lead and oxygen gas coexistent atmosphere for 2 hours. The Specific weight of the obtained sintered sample was 7.66 high, and the electromechanical coupling coefficient Kp was 0.68 high.

COMPARISON EXAMPLE 6

See Comparison Example 5.

EXAMPLE 11

Figure 5:
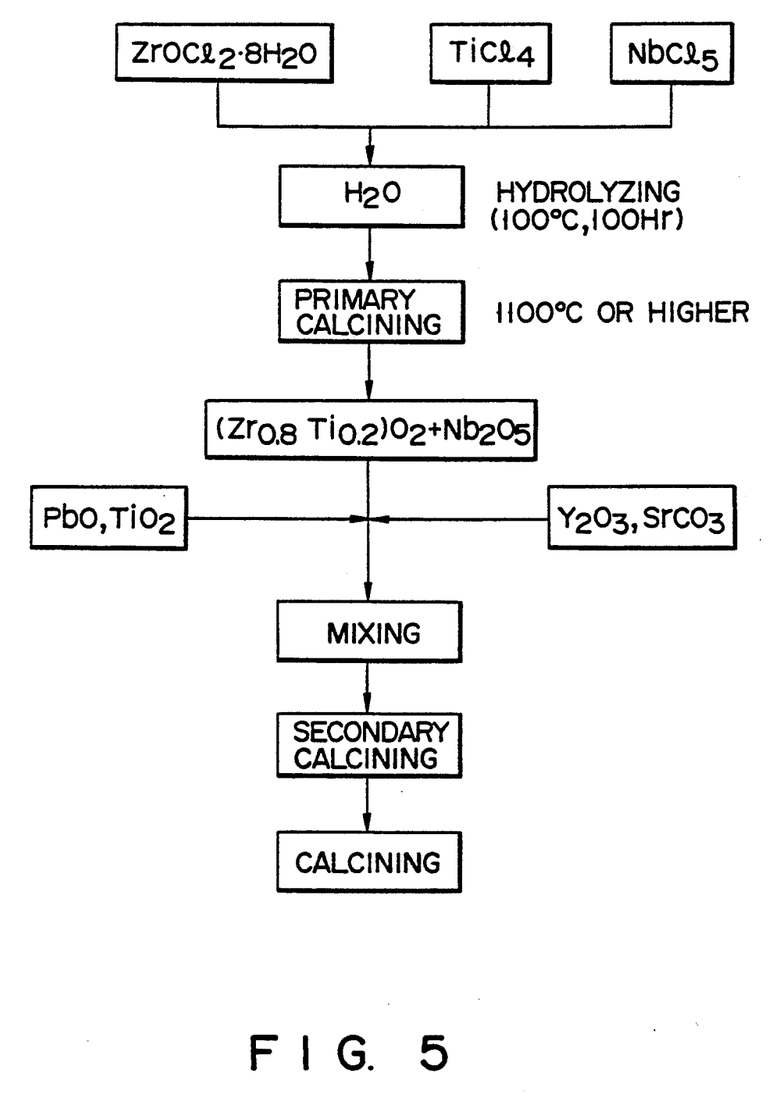

As shown in FIG. 5, when producing sol containing $Ti^{4+}$ and $Zr^{4+}$ by hydrolyzing, sol containing $Nb^{5+}$ was simultaneously hydrolyzed. Thereafter, three-component solid solution of the characteristics shown in the sample 5 in Table 1 was formed through the steps similarly to those in Example 10.

In this Example, since $Nb_2O_5$ having wrong dispersibility was produced by a hydrolyzing method, the $Nb_2O_5$ was uniformly dispersed, and the specific weight and other characteristics exceeded slightly those in Example 10.

In this Example, $Nb_2O_5$ was used as additive. However, in addition, $Sb_2O_5$, $WO_3$, NdO, $LaO_2$, $Ta_2O_5$, $Bi_2O_3$, $Pr_6O_{11}$, etc., may be used.

EXAMPLE 12

Figure 6:
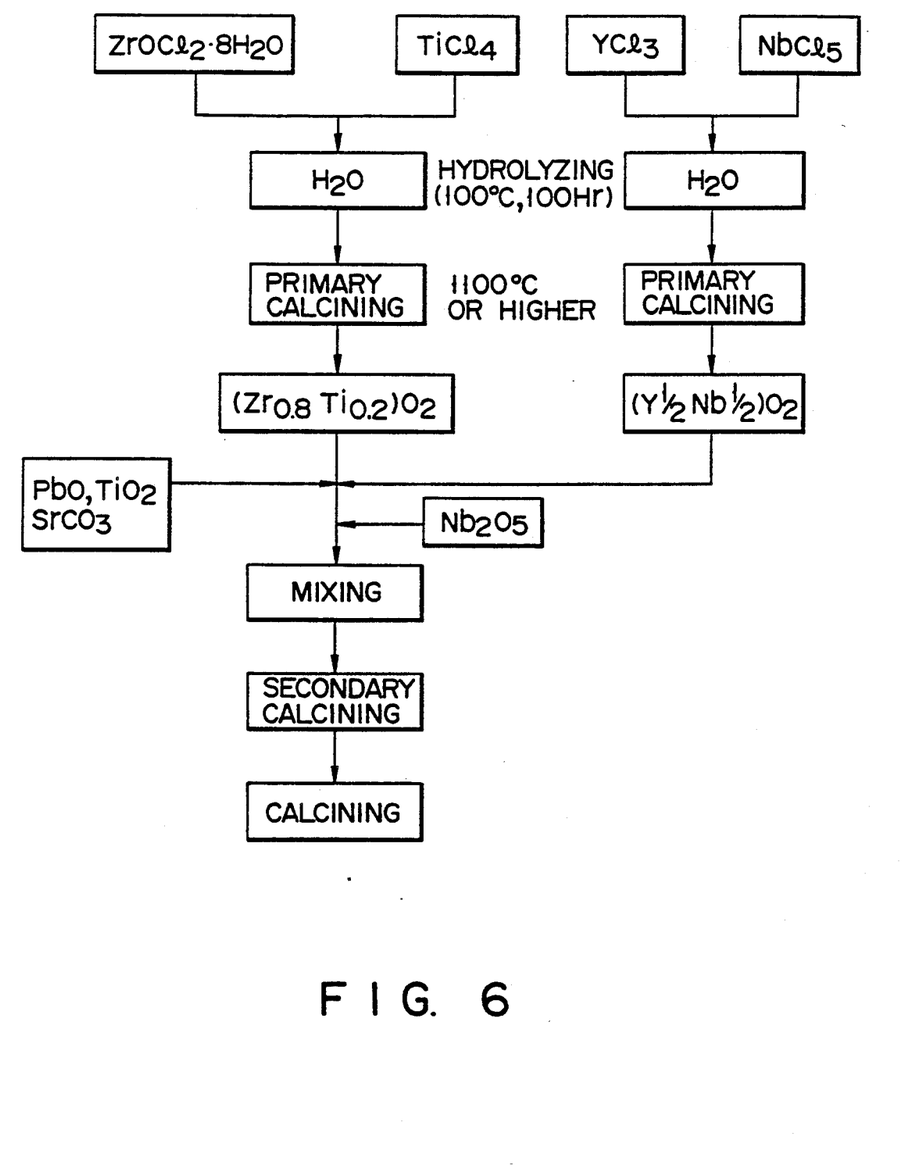

As shown in FIG. 6, sol containing $Y^{3+}$ and $Nb^{5+}$ was produced by hydrolyzing method except $(Zr_{0.8}Ti_{0.2})O_2$ to produce in advance $(Y_\frac{1}{2}Nb_\frac{1}{2})O_2$ by calcining the sol, and the sample indicated by the sample 6 in Table 1 was produced in the similar steps to those in the Example 10.

The dispersibility of $Nb_2O_5$ was uniformly performed even in this Example, and substantially similar result to those in Example 11 were obtained.

EXAMPLE 13

This example produced perovskite ceramics containing zirconium.

43.57 cc of aqueous titanium tetrachloride solution (1.3317 mol/l density) and 150 cc of aqueous zirconium oxychloride solution (1.146 mol/l density) were mixed. This aqueous mixture solution was hydrolyzed by holding the mixture solution at 100° C. for 100 hours to obtain sol containing $Ti^{4+}$ and $Zr^{4+}$. This sol was cleaned and dried, and then calcined at 1100° C. to produce powder of $(Ti_{0.2}Zr_{0.8})O_2$. The mean particle diameter of the powder were approx. 0.32 micron.

1.1985 g of fine powder of $TiO_2$, 11.16 g of PbO powder, 0.8861 g of fine particles of $Nb_2O_5$ and 0.2675 g of $CoO_4$ powder calcined at 750° C. with cobalt hydroxide sold in the market were mixed together with 2.8639 g of the calcined powder in a ball mill for a whole day and night, the mixture was then calcined at 750° C. for 1 hour to produce powder of three-component piezoelectric ceramic powder represented by $0.2Pb(Co_{1/3}Nb_{2/3})O_3$-$0.4PbZrO_3$-$0.4PbTiO_3$. The particle diameter of this powder was approx. 0.39 micron.

The powder was molded under the pressure of 1 ton/cm², sintered at 1200° C. in lead vapor and oxygen gas coexistent atmosphere for 1 hour to produce ceramics, and the density of the ceramics was 7.93 extremely near theoretical density.

COMPARISON EXAMPLE 7

Powders of PbO, $Nb_2O_5$, $TiO_2$, $ZrO_2$ and CoO powders sold in the market were so mixed as to produce a composition of $0.2Pb(Co_{1/3}Nb_{2/3})O_3$-$0.4PbTiO_3$-$0.4PbZrO_3$. After the mixtures were mixed in a ball mill for a whole day and night, the mixture was calcined at 800° C. for 2 hours. After the calcined powder thus obtained was molded at 1 ton/cm², the molded powder was sintered at 1200° C. in lead vapor and oxygen gas coexistent atmosphere for 2 hour, and the density of the ceramics thus obtained was approx. 6.8.

The powder thus calcined was made of large coagulation, and the mean particle diameter could not accordingly be specified.

The perovskite ceramics obtained in Example 13 is represented by general formula $ABO_3$, where A component is, for example, rare earth elements, such as Pb, Ba, Ca, Sr and La, B component is, for example, zirconium, and Ti, Mg, Sc, Hf, Th, W, Nb, Ta, Cr, Mo, Mn, Fe, Co, Ni, Cd, Al, Sn, As, Bi, etc.

The functional ceramics of such perovskite type is ordinarily added generally with fine amount of assistant to improve the sinterability and characteristics.

The components and the amounts of perovskite to be dissolved in the zirconium solution are preferably capable of suppressing the coagulation of zirconium powder eventually obtained by adding the component and the component commonly contained in the perovskite functional ceramics. The calcining temperatures of the sol thus obtained are 700° to 1300° C. If the calcining temperature of the sol is lower than 700° C., coagulation remarkably occurs, while if the calcining temperature is higher than 1300° C., the particles are increased. Insufficient component except zirconium is supplemented to the calcined product thus obtained. In this case, the particle size of any compound powder (mainly oxide) employs submicron order. However, even if the lead oxide powder may employ large diameter, the characteristics of the obtained perovskite powder are not almost affected.

The calcining temperature of the mixture is largely varied in case of including Pb, Ba or Sr, and further No or Ta to 500° to 1300° C. In summary, it is necessary to fall in a range of the lowest temperature for substantially or completely finishing the solid reaction to the highest temperature for not producing remarkably particle growth.

drying the sol; and calcining the sol at 700° to 1300° C., thereby forming a modified powder; and a second step of: mixing the modified powder obtained through the first step with a mixture which contains the remaining titanium and the other components, lead, niobium, and yttrium, necessary to produce said powdered $Pb(Y_{\frac{1}{2}}Nb_{\frac{1}{2}})O_3$-$PbTiO_3$-$PbZrO_3$ compound, and calcining the resultant mixture at 500° to 1,200° C., thereby producing said powdered $Pb(Y_{\frac{1}{2}}Nb_{\frac{1}{2}})O_3$-$PbTiO_3$-$PbZrO_3$ compound.

2. A method for producing a powdered $Pb(Y_{\frac{1}{2}}Nb_{\frac{1}{2}})O_3$-$PbTiO_3$-$PbZrO_3$ compound, said method comprising:

a first step of: preparing a first aqueous solution which contains zirconium in an amount necessary to produce said powdered $Pb(Y_{\frac{1}{2}}Nb_{\frac{1}{2}})O_3$-$PbTiO_3$-$PbZrO_3$ compound, and a second aqueous solution which contains titanium in an amount corresponding to part of a total amount necessary to produce said powdered $Pb(Y_{\frac{1}{2}}Nb_{\frac{1}{2}})O_3$-$PbTiO_3$-$PbZrO_3$ compound; mixing the first and second aqueous solutions, thereby forming a mixture; adding the mixture to a coprecipitant solution thereby forming a coprecipitate; and calcining the coprecipitate to 700° to 1300° C., thereby producing a modified powder; and a second step of: mixing the modified powder obtained through the first step with a mixture which contains the remaining titanium and the other components, lead, niobium, and yttrium, necessary to

TABLE 1

| Sample No. | Composition | Method of this invention ||| Method of Controller |||
|---|---|---|---|---|---|---|---|
| | | Calcine Tem. | Specific Weight | C. (Kp) | Calcine Temp. | Specific weight | C. (kp) |
| 1 | $0.02Pb(Y_{\frac{1}{2}}Nb_{\frac{1}{2}})O_3$-$0.43PbTiO_3$-$0.55PbZrO_3$+$0.5W\% Nb_2O_3$ (12.5 mol % of Pb is Sr-substituted) | 1160 | 7.66 | 0.68 | 1300 | 7.38 | 0.60 |
| 2 | $0.02Pb(Y_{\frac{1}{2}}Nb_{\frac{1}{2}})O_3$-$0.43PbTiO_3$-$0.55PbZrO_3$+$1.0W\% Nb_2O_5$ (12.5 mol % of Sr-substituted) | 1160 | 7.67 | 0.66 | 1300 | 7.40 | 0.59 |
| 3 | $0.01Pb(Y_{\frac{1}{2}}Nb_{\frac{1}{2}})O_3$-$0.40PbTiO_3$-$0.55PbZrO_3$+$1.0W\% Nb_2O_5$ (12.5 mol % of Sr-substituted) | 1160 | 7.65 | 0.67 | 1300 | 7.36 | 0.57 |
| 4 | $0.02Pb(Y_{\frac{1}{2}}Nb_{\frac{1}{2}})O_3$-$0.40PbTiO_3$-$0.58PbZrO_3$+$0.5W\% NbO_5$ (12.5 mol % of Si-substituted) | 1160 | 7.70 | 0.69 | 1300 | 7.41 | 0.61 |
| 5 | $0.02Pb(Y_{\frac{1}{2}}Nb_{\frac{1}{2}})O_3$-$0.43PbTiO_3$-$0.55PbZrO_3$+$0.5W\% Nb_2O_3$ (12.5 mol % of Pb is Sr-substituted) | 1160 | 7.69 | 0.79 | | | |
| 6 | $0.02Pb(Y_{\frac{1}{2}}Nb_{\frac{1}{2}})O_3$-$0.43PbTiO_3$-$0.55PbZrO_3$+$0.5W\% Nb_2O_3$ (12.5 mol % of Pb is Sr-substituted) | 1160 | 7.68 | 0.70 | | | |

What is claimed is:

1. A method for producing a powdered $Pb(Y_{\frac{1}{2}}Nb_{\frac{1}{2}})O_3$-$PbTiO_3$ compound, said method comprising:

a first step of: preparing a first aqueous solution which contains zirconium in an amount necessary to produce said powdered $Pb(Y_{\frac{1}{2}}Nb_{\frac{1}{2}})O_3$-$PbTiO_3$-$PbZrO_3$ compound, and a second aqueous solution which contains titanium in an amount corresponding to part of the total amount necessary to produce said powdered $Pb(Y_{\frac{1}{2}}Nb_{\frac{1}{2}})O_3$-$PbTiO_3$-$PbZrO_3$ compound; mixing the first and second aqueous solutions, thereby producing a mixture; hydrolyzing the mixture, thereby producing a sol;

produce said powdered $Pb(Y_{\frac{1}{2}}Nb_{\frac{1}{2}})O_3$-$PbTiO_3$-$PbZrO_3$ compound, and calcining the resultant mixture at 500° to 1300° C., thereby producing said powdered $Pb(Y_{\frac{1}{2}}Nb_{\frac{1}{2}})O_3$-$PbTiO_3$-$PbZrO_3$ compound.

3. A method for producing a powdered $Pb(Yphd \frac{1}{2}Nb_{\frac{1}{2}})O_3$-$PbTiO_3$-$PbZrO_3$ compound, said method comprising:

a first step of: preparing a first aqueous solution which contains zirconium in an amount necessary to produce said powdered $Pb(Y_{\frac{1}{2}}Nb_{\frac{1}{2}})O_3$-$PbTi$-

O$_3$PbZrO$_3$ compound, a second aqueous solution which contains titanium in an amount corresponding to part of a total amount necessary to produce said powdered Pb(Y$_{\frac{1}{2}}$Nb$_{\frac{1}{2}}$)O$_3$-PbTiO$_3$-PbZrO$_3$ compound, and a third aqueous solution which contains niobium in an amount necessary to produce said powdered Pb(Y$_{\frac{1}{2}}$Nb$_{\frac{1}{2}}$)O$_3$-PbTiO$_3$-PbZrO$_3$ compound; mixing the first, second and third aqueous solutions, thereby forming a mixture; hydrolyzing the mixture, thereby forming a sol; drying the sol; and calcining the sol at 700° to 1300° C., thereby producing a modified powder; and a second step of: mixing the modified powder obtained through the first step with a mixture which contains the remaining titanium and the other components, lead and yttrium, necessary to produce said powdered Pb(Y$_{\frac{1}{2}}$Nb$_{\frac{1}{2}}$)O$_3$-PbTiO$_3$-PbZrO$_3$ compound, and calcining the resultant mixture at 500° to 1300° C., thereby producing said powdered Pb(Y$_{\frac{1}{2}}$Nb$_{\frac{1}{2}}$)O$_3$-PbTiO$_3$-PbZrO$_3$ compound.

4. A method for producing a powdered Pb(Y$_{\frac{1}{2}}$Nb$_{\frac{1}{2}}$)O$_3$-PbTiO$_3$-PbZrO$_3$ compound, said method comprising:

a first step of: preparing a first aqueous solution which contains zirconium in an amount necessary to produce said powdered Pb(Y$_{\frac{1}{2}}$Nb$_{\frac{1}{2}}$)O$_3$PbTiO$_3$-PbZrO$_3$ compound, a second aqueous solution which contains titanium in an amount corresponding to part of the total amount necessary to produce said powdered Pb(Y$_{\frac{1}{2}}$Nb$_{\frac{1}{2}}$)O$_3$-PbTiO$_3$-PbZrO$_3$ compound, a third aqueous solution which contains yttrium in an amount necessary to produce said powdered Pb(Y$_{\frac{1}{2}}$Nb$_{\frac{1}{2}}$)O$_3$-PbTiO$_3$-PbZrO$_3$ compound, and a fourth aqueous solution which contains niobium in an amount corresponding to part of the total amount necessary to produce said powdered Pb(Y$_{\frac{1}{2}}$Nb$_{\frac{1}{2}}$)O$_3$-PbTiO$_3$-PbZrO$_3$ compound, a third aqueous solution which contains yttrium in an amount necessary to produce said powdered Pb(Y$_{\frac{1}{2}}$Nb$_{\frac{1}{2}}$)O$_3$-PbTiO$_3$-PbZrO$_3$ compound, and a fourth aqueous solution which contains niobium in an amount corresponding to part of the total amount necessary to produce said powdered Pb(Y$_{\frac{1}{2}}$Nb$_{\frac{1}{2}}$)O$_3$-PbTiO$_3$-PbZrO$_3$ compound; mixing the first and second aqueous solutions, thereby forming a first mixture; hydrolyzing the first mixture, thereby forming a first sol; drying the first sol; calcining the first sol at 700° to 1300° C., thereby producing a first modified powder; mixing the third and fourth aqueous solutions, thereby forming a second mixture; hydrolyzing the second mixture, thereby forming a second sol; drying the second sol; and calcining the second sol at 700° to 1300° C., thereby producing a second modified powder; and a second step of: mixing the first and second modified powder obtained through the first step with a mixture which contains the remaining titanium and niobium and the other component, lead, necessary to produce said powdered Pb(Y$_{\frac{1}{2}}$Nb$_{\frac{1}{2}}$)O$_3$PbTiO$_3$-PbZrO$_3$ compound, and calcining the resultant mixture at 500° to 1300° C., thereby producing said powdered Pb(Y$_{178}$ Nb$_{\frac{1}{2}}$)O$_3$-PbTiO$_3$-PbZrO$_3$ compound.

5. A method for producing a powdered Pb(Y$_{\frac{1}{2}}$Nb$_{\frac{1}{2}}$)O$_3$-PbTiO$_3$-PhZrO$_3$ compound, said method comprising:

a first step of: preparing a first aqueous solution which contains zirconium in an amount necessary to produce said powdered Pb(Y$_{\frac{1}{2}}$Nb$_{\frac{1}{2}}$)O$_3$-PbTiO$_3$-PbZrO$_3$ compound, a second aqueous solution which contains titanium in an amount corresponding to part of the total amount necessary to produce said powdered Pb(Y$_{\frac{1}{2}}$Nb$_{\frac{1}{2}}$)O$_3$-PbTiO$_3$-PbZrO$_3$ compound, and a third aqueous solution which contains niobium in an amount necessary to produce said powdered Pb(Y$_{\frac{1}{2}}$Nb$_{\frac{1}{2}}$)O$_3$-PbTiO$_3$-PbZrO$_3$ compound; mixing the first to third aqueous solutions, thereby forming a mixture; adding the mixture to a coprecipitant solution, thereby forming a coprecipitate; and calcining the coprecipitate at 700° to 1300° C., thereby producing a modified powder; and a second step of: mixing the modified powder obtained through the first step with a mixture which contains the remaining titanium and the other components, lead and yttrium, necessary to produce said powdered Pb(Y$_{\frac{1}{2}}$Nb$_{\frac{1}{2}}$)O$_3$-PbTiO$_3$-PbZrO$_3$ compound, and calcining the resultant mixture at 500° to 1300° C., thereby producing said powdered Pb(Y$_{\frac{1}{2}}$Nb$_{\frac{1}{2}}$)O$_3$-PbTiO$_3$-PbZrO$_3$ compound.

6. A method for producing a powdered Pb(Y$_{\frac{1}{2}}$Nb$_{\frac{1}{2}}$)O$_3$-PbTiO$_3$-PbZrO$_3$ compound, said method comprising:

a first step of: preparing a first aqueous solution which contains zirconium in an amount necessary to produce said powdered Pb(Y$_{\frac{1}{2}}$Nb$_{\frac{1}{2}}$)O$_3$-PbTiO$_3$-PbZrO$_3$ compound, a second aqueous solution which contains titanium in an amount corresponding to part of the total amount necessary to produce said powdered Pb(T$_{\frac{1}{2}}$Nb$_{\frac{1}{2}}$)O$_3$-PbTiO$_3$-PbZrO$_3$ compound, a third aqueous solution which contains yttrium in an amount necessary to produce said powdered Pb(Y$_{\frac{1}{2}}$Nb$_{\frac{1}{2}}$)O$_3$-PbTiO$_3$-PbZrO$_3$ compound, and a fourth aqueous solution which contains niobium in an amount corresponding to part of the total amount necessary to produce said powdered Pb(Y$_{\frac{1}{2}}$Nb$_{\frac{1}{2}}$)O$_3$-PbTiO$_3$-PbZrO$_3$ compound; mixing the first to fourth aqueous solutions, thereby forming a mixture; adding the mixture to a coprecipitant solution, thereby forming a coprecipitate; and calcining the coprecipitate at 700° to 1300° C., thereby producing a modified powder; and a second step of: mixing the modified powder obtained through the first step with a mixture which contains the remaining titanium and niobium and the other component, lead, necessary to produce said powdered Pb(Y$_{\frac{1}{2}}$Nb$_{\frac{1}{2}}$)O$_3$-PbTiO$_3$-PbZrO$_3$ compound, and calcining the resultant mixture at 500° to 1300° C., thereby producing said powdered Pb(Y$_{\frac{1}{2}}$Nb$_{\frac{1}{2}}$)O$_3$-PbTiO$_3$-PbZrO$_3$ compound.

* * * * *

UNITED STATES PATENT AND TRADEMARK OFFICE
CERTIFICATE OF CORRECTION

PATENT NO. : 4,990,324

DATED : February 5, 1991

INVENTOR(S) : Tomita et al

It is certified that error appears in the above-identified patent and that said Letters Patent is hereby corrected as shown below:

ON THE TITLE PAGE:

Please change: (3rd inventor)

"(75) Inventors: Naoto Niwa"    to

--(75) Inventors: Naoto Miwa--.

Signed and Sealed this

Sixth Day of October, 1992

Attest:

DOUGLAS B. COMER

*Attesting Officer*      Acting Commissioner of Patents and Trademarks